(12) United States Patent  
Miyanaga

(10) Patent No.: US 8,368,962 B2  
(45) Date of Patent: Feb. 5, 2013

(54) COLOR LOOK UP TABLE ADJUSTING APPARATUS, RECORDING MEDIUM ON WHICH A COLOR LOOK UP TABLE ADJUSTING PROGRAM IS RECORDED AND COLOR LOOK UP TABLE ADJUSTING SYSTEM

(75) Inventor: Yuka Miyanaga, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 550 days.

(21) Appl. No.: 12/729,844

(22) Filed: Mar. 23, 2010

(65) Prior Publication Data

US 2010/0302596 A1    Dec. 2, 2010

(30) Foreign Application Priority Data

May 29, 2009   (JP) ................................. 2009-131339

(51) Int. Cl.  
*G06F 15/00* (2006.01)  
*H04N 1/40* (2006.01)

(52) U.S. Cl. ...................................... 358/3.23; 358/1.9

(58) Field of Classification Search .................. 358/3.23, 358/1.9, 501, 515, 517, 518, 522; 382/167  
See application file for complete search history.

(56) References Cited

U.S. PATENT DOCUMENTS

| 8,139,265 | B2 * | 3/2012 | Hong | 358/1.9 |
| 2002/0036787 | A1 * | 3/2002 | Kondo | 358/1.9 |
| 2007/0092134 | A1 * | 4/2007 | Fukui et al. | 382/160 |
| 2009/0116082 | A1 * | 5/2009 | Osa et al. | 358/501 |
| 2009/0138501 | A1 * | 5/2009 | Blais | 707/103 R |
| 2010/0165412 | A1 * | 7/2010 | Aihara | 358/3.23 |

FOREIGN PATENT DOCUMENTS

| JP | 1996-149320 | 6/1996 |
| JP | 2006-215808 | 8/2006 |
| JP | 2007-142901 | 6/2007 |
| JP | 2006101167 | * 4/2012 |

* cited by examiner

*Primary Examiner* — Jerome Grant, II  
(74) *Attorney, Agent, or Firm* — McDonnell Boehnen Hulbert & Berghoff LLP

(57) ABSTRACT

A color look up table adjusting apparatus includes: a color gamut acquisition unit that determines a color gamut from an image output by an image forming apparatus, and determines, from an image output by another image forming apparatus, a position of input color values in a color space as a target point; an interpolation process unit that calculates a point corresponding to the target point within the color gamut of the image forming apparatus as an adjustment point; a color value adjustment table generating unit that generates a color value adjustment table for converting the input color values into input color values corresponding to a position of the adjustment point; and a table organization unit that converts arbitrary input color values based on the color value adjustment table, and inputs input color values obtained after the conversion as input color values based on a color look up table.

20 Claims, 12 Drawing Sheets

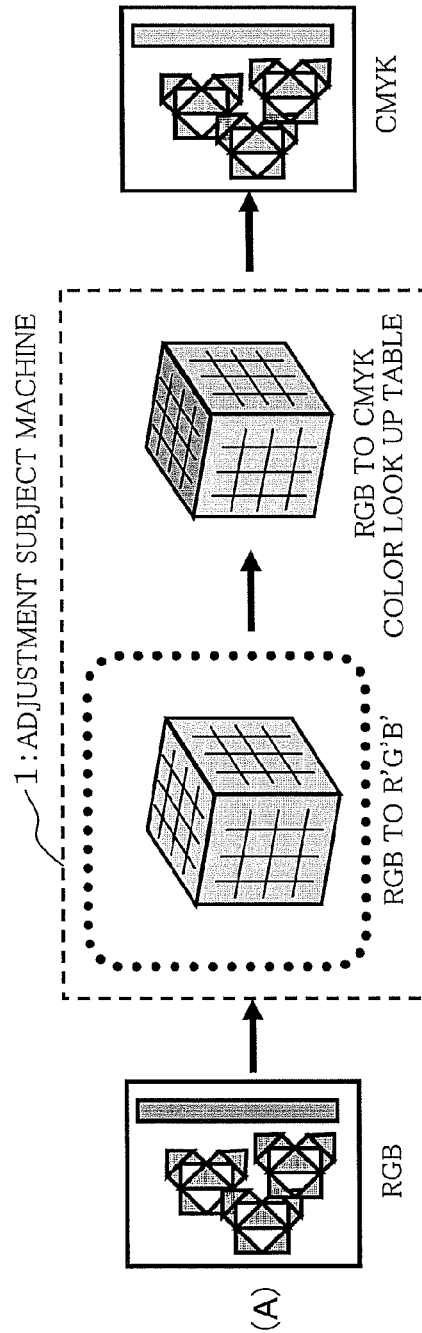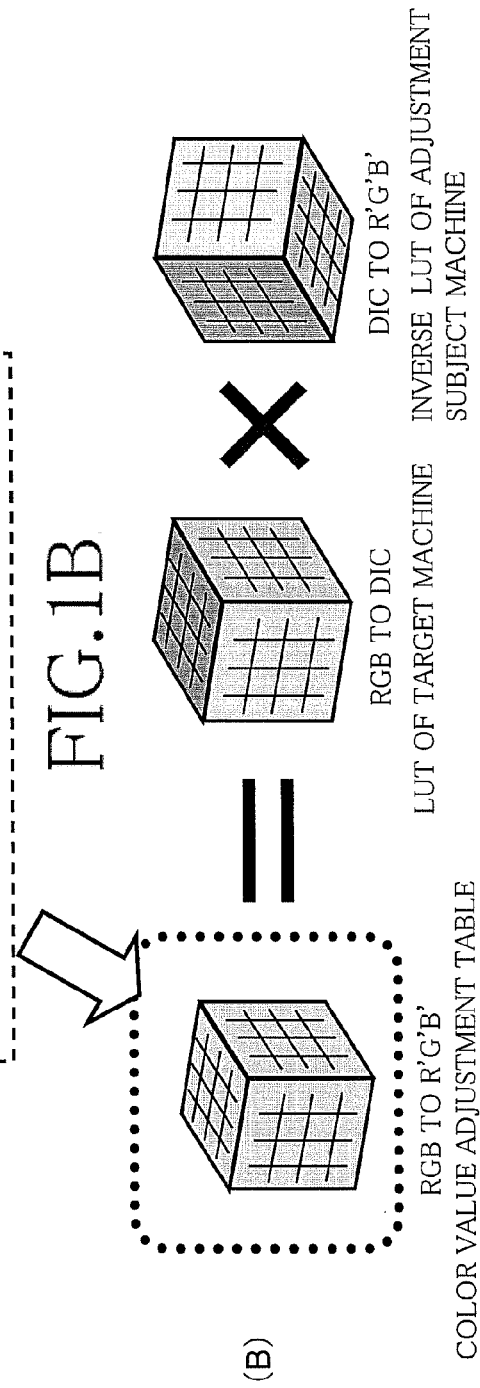

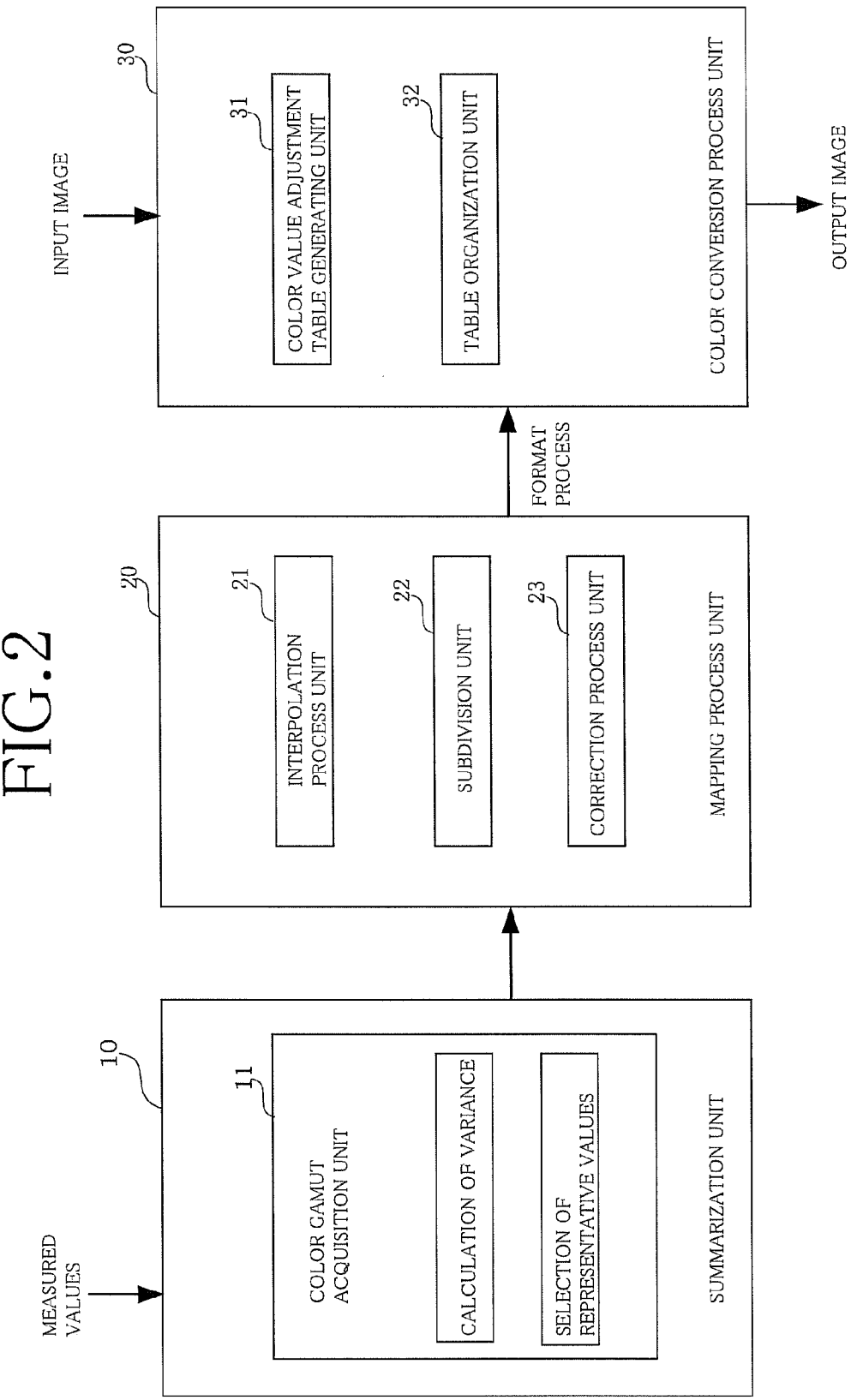

| RGB (CHART) | | | XYZ | | | | | |
|---|---|---|---|---|---|---|---|---|
| | | | SUBJECT | | | TARGET | | |
| 0 | 0 | 0 | 2.58 | 2.66 | 2.48 | 3.45 | 3.51 | 2.79 |
| 0 | 0 | 32 | 2.69 | 2.66 | 3.21 | 5.62 | 6 | 4.86 |
| : | | | : | | | : | | |
| 0 | 0 | 255 | | | | | | |
| 0 | 32 | 0 | | | | | | |
| 0 | 32 | 32 | | | | | | |
| : | | | : | | | : | | |
| 255 | 255 | 255 | 75 | 80 | 69 | 83 | 86 | 70 |

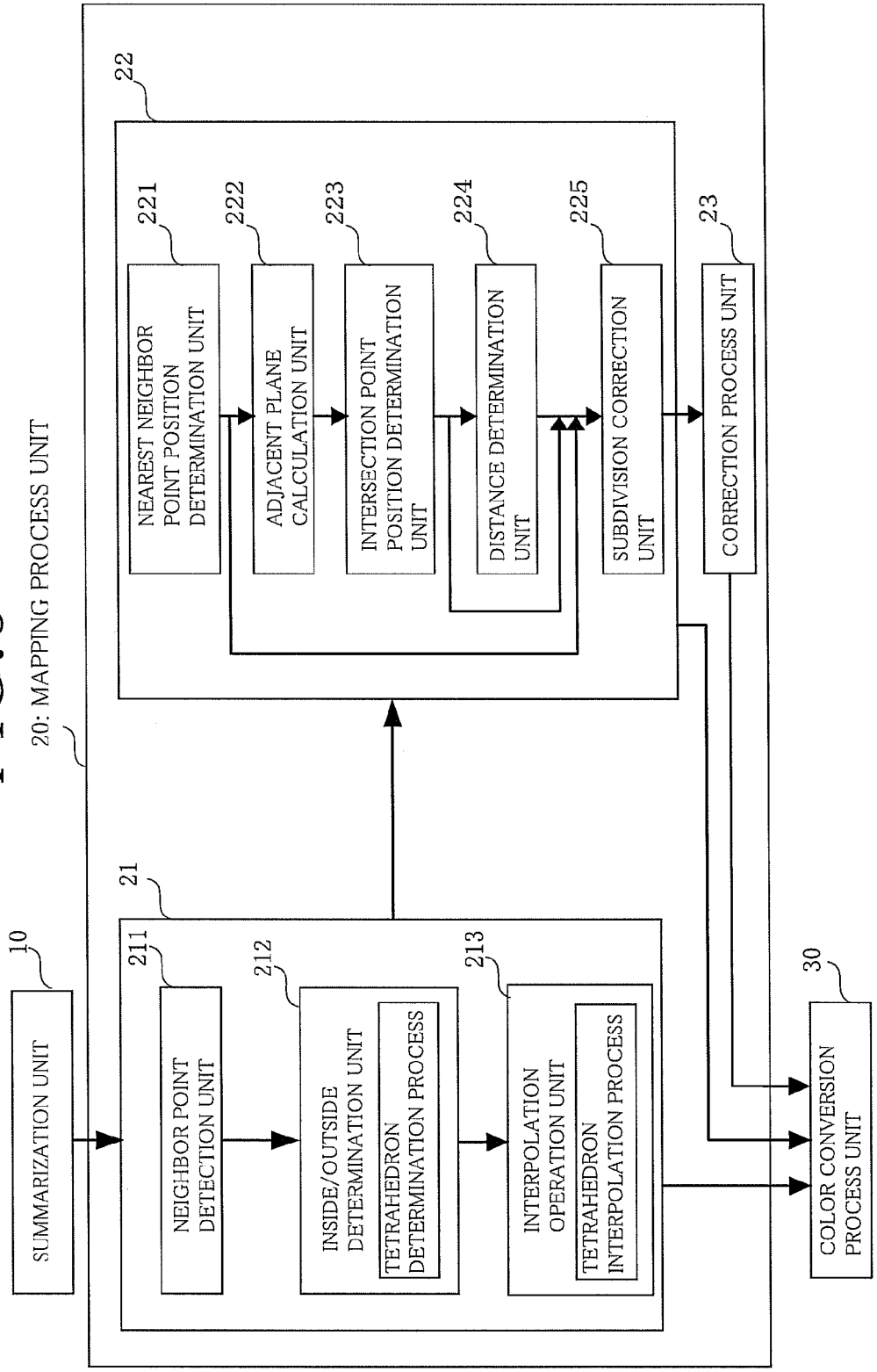

COLOR GAMUT OF
ADJUSTMENT SUBJECT MACHINE

- T: TARGET POINT
- ○ LATTICE-POINT
- ● Ck NEIGHBOR POINT

TETRAHEDRON INTERPOLATION PROCESS $$\vec{T} = \frac{V1 \cdot \vec{D} + V2 \cdot \vec{B} + V3 \cdot \vec{C} + V4 \cdot \vec{A}}{V}$$

COLOR LOOK UP TABLE ADJUSTING APPARATUS, RECORDING MEDIUM ON WHICH A COLOR LOOK UP TABLE ADJUSTING PROGRAM IS RECORDED AND COLOR LOOK UP TABLE ADJUSTING SYSTEM

INCORPORATION BY REFERENCE

This application is based upon and claims the benefit of priority from corresponding Japanese Patent Application No. 2009-131339, filed May 29, 2009, the entire contents of which is incorporated herein by reference.

BACKGROUND OF THE INVENTION

1. Field of the Invention

The present invention relates to a color look up table adjusting apparatus which causes a color conversion characteristic of an image forming apparatus to match or approach a characteristic desired by a user, and a recording medium on which a color look up table adjusting program is recorded.

2. Description of the Related Art

With an increase in the speed of CPUs and a decrease in the price thereof, high-end machines having high performance and versatility are becoming widespread in the field of an image forming technology.

In recent years, an increasing number of full-color printers of a new type that are superior in color reproducibility have appeared on the market. Introduction of such a new type of printer may raise demand for reproduction of the same tint as that of the color "red" expressed by a printer used before, for example. Performing a color adjustment for such a printer requires superior knowledge on chromatology. However, it is difficult for general users to cope with the situation due to lack of such knowledge.

Further, colors that may be reproduced by the printer vary depending not only upon the manufacturer, the model, the performance, and other such characteristics of the printer, but also upon the use environment and the age of the printer.

Therefore, it is necessary to closely analyze the characteristics of an image forming apparatus and to change data of a look up table (LUT) on a subject apparatus using a result of the analysis.

To solve the above-mentioned problem, there is a technology for obtaining a correspondence between a target image signal and a reproduction image signal and creating a color look up table based on the correspondence to thereby realize an association between input values to a target image device and output values therefrom by a reproduction image device.

However, when such a technology as described above is used, there is a possibility that hues may no longer be maintained. This is because the shape of a boundary plane with respect to a color gamut varies depending upon the subject image forming apparatus, a positional relationship between corresponding target image signals within a color space becomes irregular depending upon the color values thereof, and reproducibility and gradation are greatly impaired.

SUMMARY OF THE INVENTION

An object of the present invention is to realize a desired tint by automating a color adjustment on an image forming apparatus and performing an optimal operation process according to a positional relationship between adjustment subject values and target values within a color space in the color adjustment.

The present invention provides a color conversion table adjusting apparatus, including: a color gamut acquisition unit configured to determine, from an image output by an image forming apparatus based on input color values, a lattice point indicating a position of the input color values in a color space and an area including the lattice point as a color gamut of the image forming apparatus, and further configured to determine, from an image actually output by another image forming apparatus based on input color values equal to the input color values, a position of the input color values in the color space as a target point; an interpolation process unit configured to calculate a point corresponding to the target point within the color gamut of the image forming apparatus as an adjustment point; a color value adjustment table generating unit configured to generate a color value adjustment table for converting the input color values into converted input color values corresponding to a position of the adjustment point calculated by the interpolation process unit; and a table organization unit configured to convert arbitrary input color values based on the color value adjustment table, and inputs converted input color values obtained after the conversion as input color values based on a color conversion table.

Further, the present invention provides a computer-readable recording medium having a color conversion table adjusting program recorded thereon, the color conversion table adjusting program causing a computer to execute: a color gamut acquisition step of determining, from an image output by an image forming apparatus based on input color values, a lattice point indicating a position of the input color values in a color space and an area including the lattice point as a color gamut of the image forming apparatus, and determining, from an image output by another image forming apparatus based on the input color values, a position of the input color values in the color space as a target point; an interpolation process step of calculating a point corresponding to the target point within the color gamut of the image forming apparatus as an adjustment point; a color value adjustment table generating step of generating a color value adjustment table for converting the input color values into converted input color values corresponding to a position of the adjustment point; and a table organization step of converting arbitrary input color values based on the color value adjustment table, and inputting converted input color values obtained after the conversion as input color values based on a color conversion table.

Additional features and advantages are described herein, and will be apparent from the following Detailed Description and figures.

BRIEF DESCRIPTION OF THE FIGURES

In the accompanying drawings:

FIGS. 1A and 1B are schematic diagrams illustrating an outline of a color look up table adjusting apparatus (adjustment subject machine) according to an embodiment of the present invention;

FIG. 2 is a block diagram illustrating the adjustment subject machine according to the embodiment of the present invention;

FIG. 5 is a block diagram illustrating a detailed configuration of a mapping process unit of the adjustment subject machine according to the embodiment of the present invention;

DETAILED DESCRIPTION OF THE PREFERRED EMBODIMENTS

Figure 3:
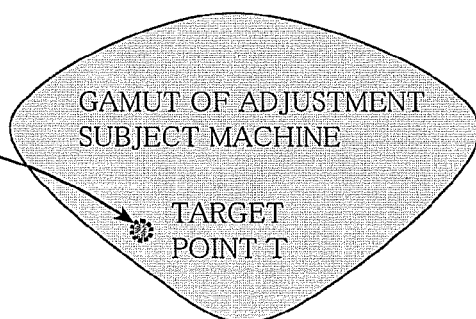
FIG. 3 is a table and a chart for indicating measured values used for a color gamut acquisition process in the embodiment of the present invention.

FIGS. 1A and 1B are used to describe an outline of a color look up table adjusting apparatus according to an embodiment of the present invention.

In this embodiment, a color conversion characteristic of the color look up table adjusting apparatus (hereinafter referred to as "adjustment subject machine 1") having an image forming function is caused to approach a color conversion characteristic of another image forming apparatus (hereinafter referred to as "target machine 2"). This allows the adjustment subject machine 1 to reproduce a tint to be exhibited by the target machine 2 as a desired tint.

Therefore, as illustrated in FIG. 1A, the adjustment subject machine 1 is configured to convert input color values (RGB format) into other input color values (R'G'B') to obtain a color value adjustment table (RGB to R'G'B') in an upstream process of the color conversion performed based on an existing color look up table.

Specifically, as illustrated in FIG. 1B, an inverse conversion table (DIC to R'G'B') of the color look up table of the adjustment subject machine 1 and a conversion table (RGB to DIC) of the target machine 2 are combined to generate a color value adjustment table (RGB to R'G'B'). Then, the color value adjustment table is incorporated into the configuration of the adjustment subject machine 1 to thereby realize desired output color values (CMYK format).

Further, a device independent color (DIC) space is used to provide consistency between different input/output characteristics with precision and efficiency.

FIG. 2 is a block diagram illustrating a configuration of the adjustment subject machine according to this embodiment.

The adjustment subject machine 1 according to this embodiment includes a summarization unit 10, a mapping process unit 20, and a color conversion process unit 30.

The adjustment subject machine 1 has an image forming function related to the color conversion, which is able to convert an input image of RGB data or the like into an image of CMYK data or the like via the color conversion process unit 30 and to output the image onto a paper medium or the like.

The summarization unit 10 includes a color gamut acquisition unit 11. The color gamut acquisition unit 11 acquires a color gamut (color gamut area) unique to the adjustment subject machine 1.

Specifically, first, as illustrated by a table and a chart in FIG. 3, a series of color charts (patch image) that are printed by the adjustment subject machine 1 according to the input color values (RGB) obtained at predetermined intervals are read by an attached or external scanner or the like.

Then, an image output by the adjustment subject machine 1 based on RGB values is measured by spectrophotometry or the like to thereby obtain XYZ values (tristimulus values) that are device-independent.

Figure 4:
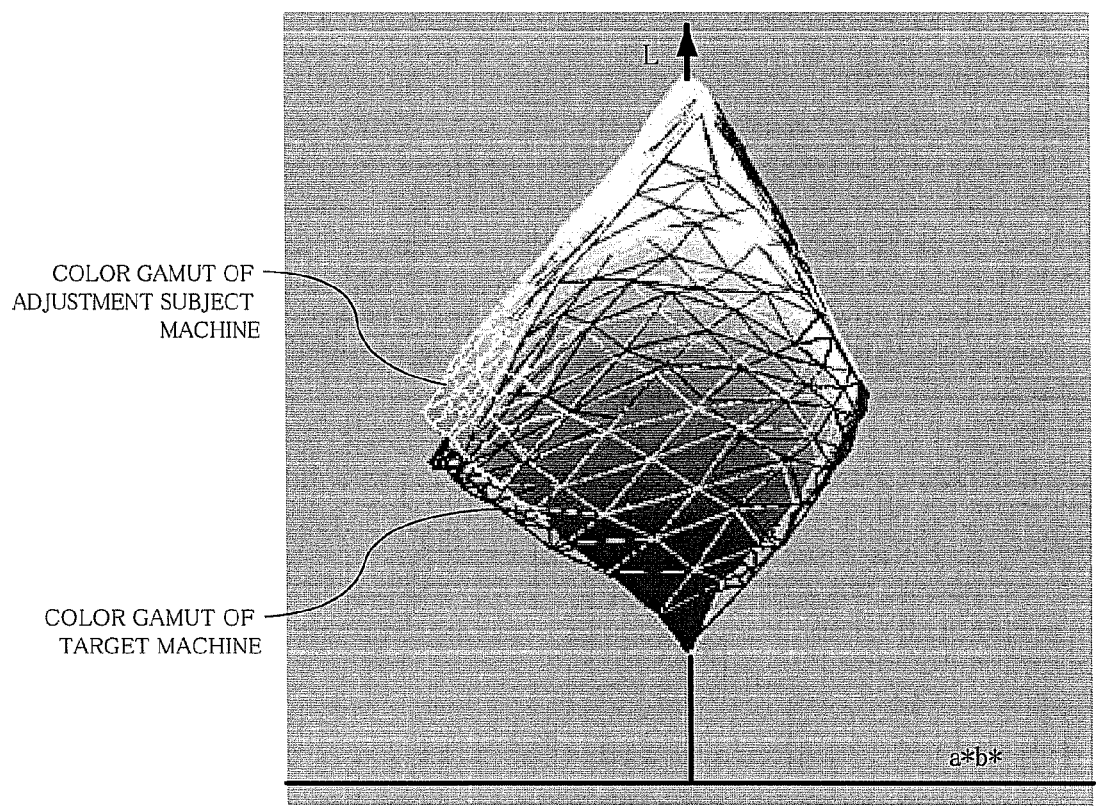
FIG. 4 is a diagram for expressing a color gamut of the adjustment subject machine and a color gamut of a target machine according to the embodiment of the present invention.

As a result, as illustrated by the white lines in FIG. 4, a current color gamut (color gamut area) of the adjustment subject machine 1 and respective lattice points therein are acquired. FIG. 4 illustrates the color gamut expressed in an L*a*b* space based on measured values (XYZ values).

Note that in such data summarization, representative values are used from a plurality of measured values obtained using the same input values a plurality of times (selection of representative values).

A selection method for representative values may include the steps of, for example, calculating a distance from an average with regard to data whose standard deviation exceeds a threshold value, disabling data exhibiting the longest distance, and calculating the representative values only from the effective data. In addition, an arithmetic mean, a geometrical mean, a median, a most frequent value, and the like may be used to obtain the representative values.

Further, in order to reduce influence due to unevenness or noise of the patch image that is exerted when printing onto paper or the like, each color image of a color chart is arrayed irregularly on the paper. A random number is used to determine the position of each color image on the paper (calculation of a variance).

The color gamut acquisition unit 11 similarly acquires a color gamut unique to the target machine 2. Accordingly, a position (lattice point) in the color gamut of the target machine 2 corresponding to the lattice point in the color gamut of the adjustment subject machine 1 is acquired as a target point T.

Specifically, as illustrated by the table and the chart in FIG. 3, based on the same input color values (RGB) as the input color values (RGB) used for the chart output from the adjustment subject machine 1, the patch image is output from the target machine 2 in the same manner. Then, coordinates are obtained from measured values of the image to acquire the target point T in an XYZ space. Note that in FIG. 3, (X, Y, Z)=(5.62, 6, 4.86) corresponding to (R, G, B)=(0, 0, 32) are the coordinates corresponding to one target point T.

As a result, as illustrated by the black lines in FIG. 4, it is possible to acquire the current color gamut of the target machine 2 and the target point T therein. As illustrated in FIG. 4, the color gamut of the adjustment subject machine 1 and the color gamut of the target machine 2 may be expressed in a common color space (XYZ space) that is device-independent. This allows an accurate color adjustment based on the accurate calculation of a color difference.

The mapping process unit 20 includes, as illustrated in FIG. 2, an interpolation process unit 21, a subdivision unit 22, and a correction process unit 23.

FIG. 5 is a block diagram illustrating a detailed configuration of the mapping process unit 20 of this embodiment. The interpolation process unit 21 includes a neighbor point detection unit 211, an inside/outside determination unit 212, and an interpolation operation unit 213.

The neighbor point detection unit 211 obtains a distance (color difference) between the lattice point in the color gamut of the adjustment subject machine 1 and a target point in the color gamut of the target machine 2, which are acquired by the color gamut acquisition unit 11 of the summarization unit 10. Then, based on the distance, the neighbor point detection unit 211 obtains a lattice point (hereinafter referred to as "neighbor point Ck," where k is an arbitrary integer) that exists in proximity to an arbitrary target point.

For example, the neighbor point detection unit 211 detects a point located in the nearest neighbor (hereinafter referred to as "nearest neighbor point C1") and the next three closest neighbor points (C2 to C4). Note that the number of neighbor points may be set in advance, and also may be changed.

The inside/outside determination unit 212 determines whether an arbitrary target point T exists inside or outside the color gamut of the adjustment subject machine 1. Specifically, the insight/outside determination is performed for each of a plurality of cubes that connect the neighbor point Ck to determine whether or not the target point T exists inside the color gamut of the adjustment subject machine 1.

Figure 6A:
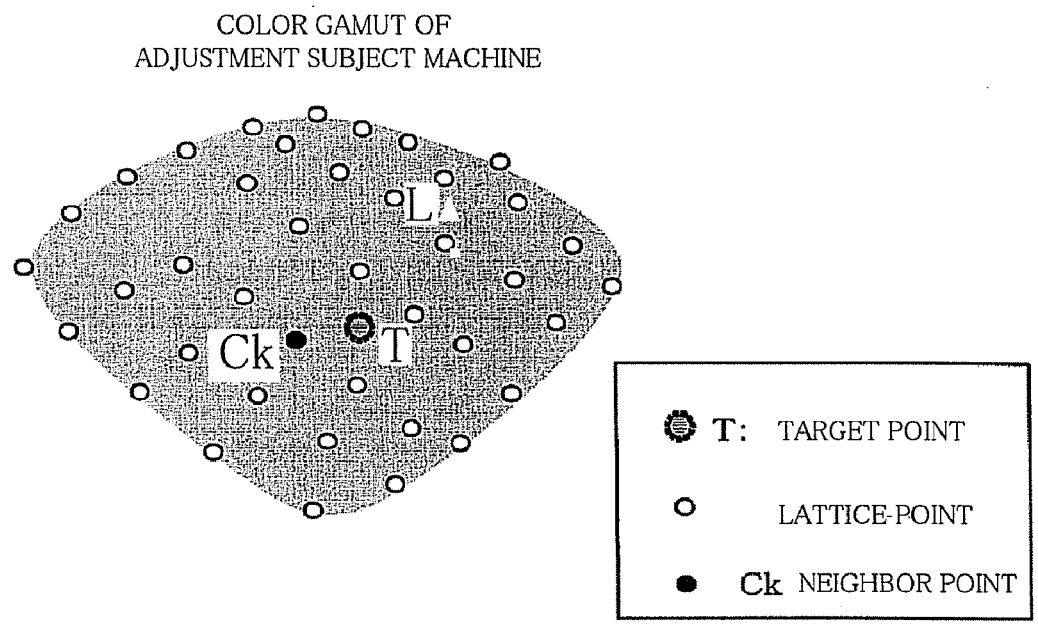
FIGS. 6A and 6B are diagrams illustrating the color gamut of the adjustment subject machine according to the embodiment of the present invention and a relationship between a target point and a nearest neighbor point, respectively.
Figure 6B:
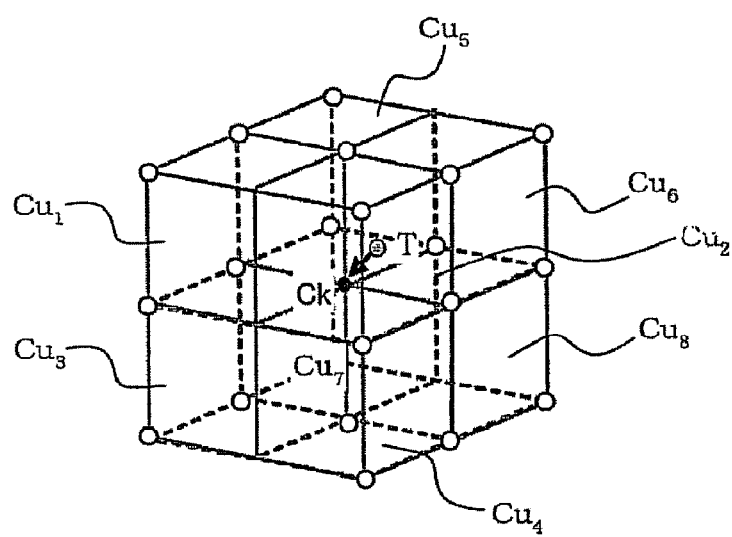

FIG. 6A illustrates a relationship between the target point T and the nearest neighbor point Ck. FIG. 6B illustrates a state in which there exist eight cubes ($Cu_1$ to $Cu_8$) surrounding the neighbor point Ck.

For example, the inside/outside determination unit 212 first analyzes whether or not the target point T exists inside the cube $Cu_1$. Subsequently, the same determination process is performed on the cubes $Cu_2$ to $Cu_8$ in order. However, if the target point T is detected inside any one of the cubes midway through the process, the target point T is determined to exist inside the color gamut of the adjustment subject machine 1, and the inside/outside determination process regarding the target point T is brought to an end.

In order to avoid an overlap of a space to be determined in the inside/outside determination, the execution of the neighbor point detection unit 211 may be controlled so as to exclude any neighbor point that has already been detected and the surrounding lattice points used for the inside/outside determination regarding the detected neighbor point from subjects of the neighbor points to be detected.

Described next is an inside/outside determination (tetrahedron determination) using tetrahedrons obtained by dividing the cube.

Figure 7:
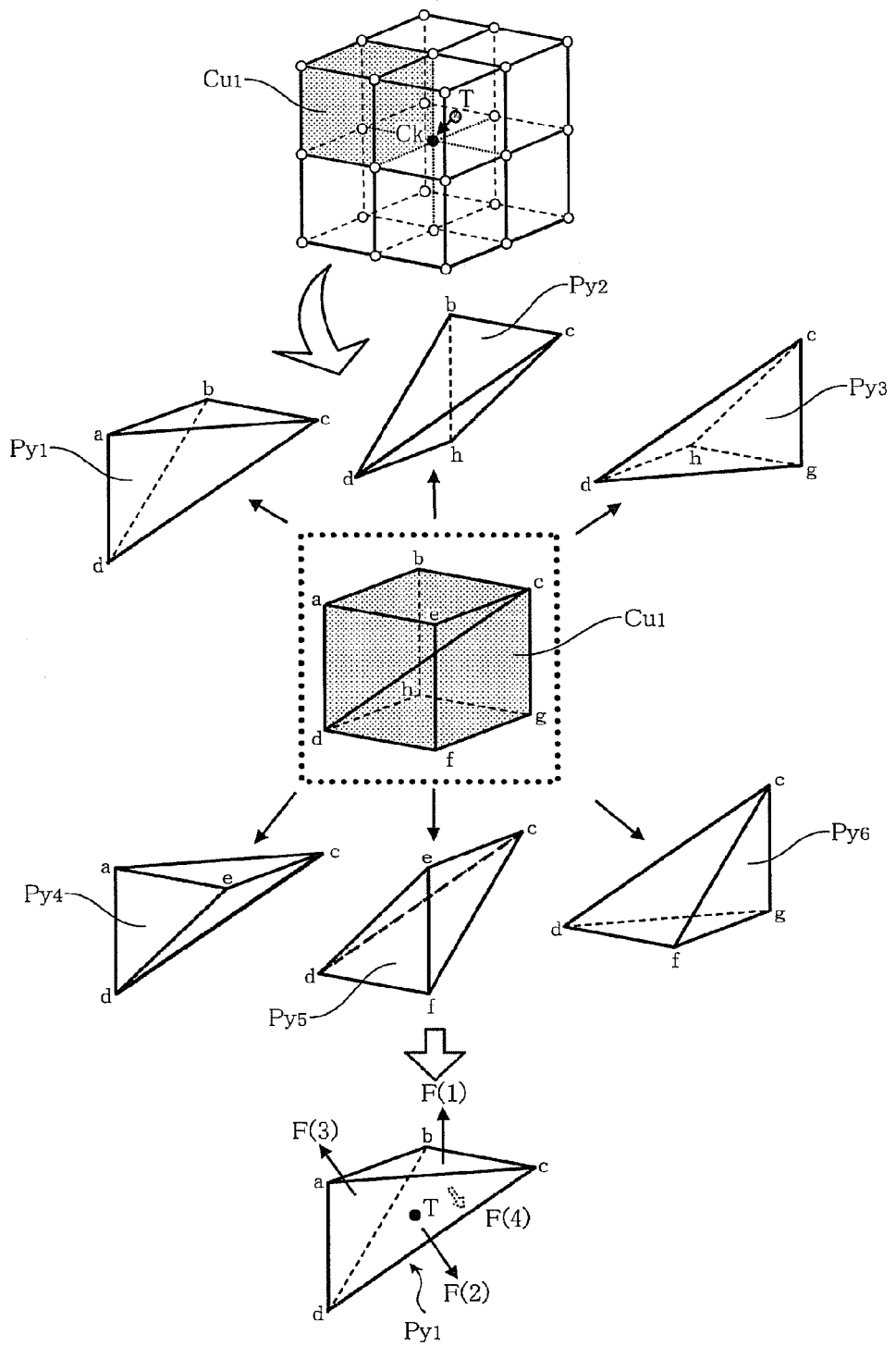
FIG. 7 is an explanatory diagram for illustrating a tetrahedron determination process according to the embodiment of the present invention.

FIG. 7 illustrates an inside/outside determination process performed for a plurality of tetrahedrons that form one of the cubes. The process includes acquiring six tetrahedrons ($Py_1$ to $Py_6$) by dividing the cube $Cu_1$.

Specifically, an equation $F(t)$ for four triangular planes that form the tetrahedron is obtained for each of the acquired tetrahedrons. Then, a result of substituting the values (XYZ values) of the target point T into the equation is calculated.

In general, assuming that a normal vector to the plane is set as ($F_1$, $F_2$, $F_3$), the equation for the plane is expressed by $F=F_1 x+F_2 y+F_3 z+F_4$.

Note that the equations for planes $\Delta abc$, $\Delta acd$, $\Delta abd$, and $\Delta bcd$ are set as F(1), F(2), F(3), and F(4), respectively.

First, in order to perform an arithmetic operation by applying the plane $\Delta abc$ to the equation therefor, in other words, F(1), assuming that a normal vector n1 to the plane $\Delta abc$ is set as $n1=b \times c=(n_x, n_y, n_z)$, it is possible to obtain the expression as $F(1)=n_x x+n_y y+n_z z+F_4$.

Further, F(1)=0 on the plane $\Delta abc$, and hence if the values of a point "a" are substituted thereinto, $n_x x+n_y y+n_z z+F_4=0$, and $F_4=-(n_x x+n_y y+n_z z)$.

Therefore, the following equation is derived:

$$F(1)=n_x x+n_y y+n_z z-(n_x a_x+n_y a_y+n_z a_z)=n_x(x-a_x)+n_y(y-a_y)+n_z(z-a_z)$$

F(1) is obtained by substituting the values of the target point T into the above-mentioned equation. As a result, if F(1)<0, the target point T exists inside the plane $\Delta Labc$. If F(1)=0, the target point T exists on the plane 66 abc. If F(1)>0, the target point T exists outside the plane $\Delta abc$.

Then, such a determination process is performed for the four triangular planes that form tetrahedron abcd.

As a result, if F(t)<0 with regard to all the triangular planes, the target point T is determined to exist inside the tetrahedron abcd. Further, if F(t)=0 with regard to any one of the triangular planes, the target point T is determined to exist on the one of the triangular planes. Further, if F(t)>0 with regard to any one of the triangular planes, the target point T is determined to exist outside the tetrahedron abcd.

A tetrahedron process described above is repeatedly performed until it is detected that the target point T exists inside any one of the tetrahedrons. In the above-mentioned example, the tetrahedron process is performed for the tetrahedrons $Py_1$ to $Py_6$ that form the cube $Cu_1$ in order.

As a result, if it is detected that the target point T exists inside any one of the tetrahedrons, the inside/outside determination unit 212 determines that the target point T exists inside the color gamut of the adjustment subject machine 1.

When a given target point T is determined to exist inside the adjustment subject machine 1, the inside/outside determination unit 212 ends the inside/outside determination for the given target point T, and performs the inside/outside determination for the next target point T.

If a given target point T is determined to exist inside the color gamut of the adjustment subject machine 1, the interpolation operation unit 213 obtains the coordinates (X, Y, Z) of the given target point T by an interpolation operation (tetrahedron interpolation process) using the tetrahedron that includes the given target point T. Then, the coordinates are set as an adjustment point corresponding to the target point T on the adjustment subject machine 1.

If the target point T exists inside the color gamut of the adjustment subject machine 1, color values thereof may be reproduced by the adjustment subject machine 1.

Therefore, in such a case, a correction process is unnecessary, and the same color values as the target color values may be reproduced on the adjustment subject machine 1.

Figure 8:
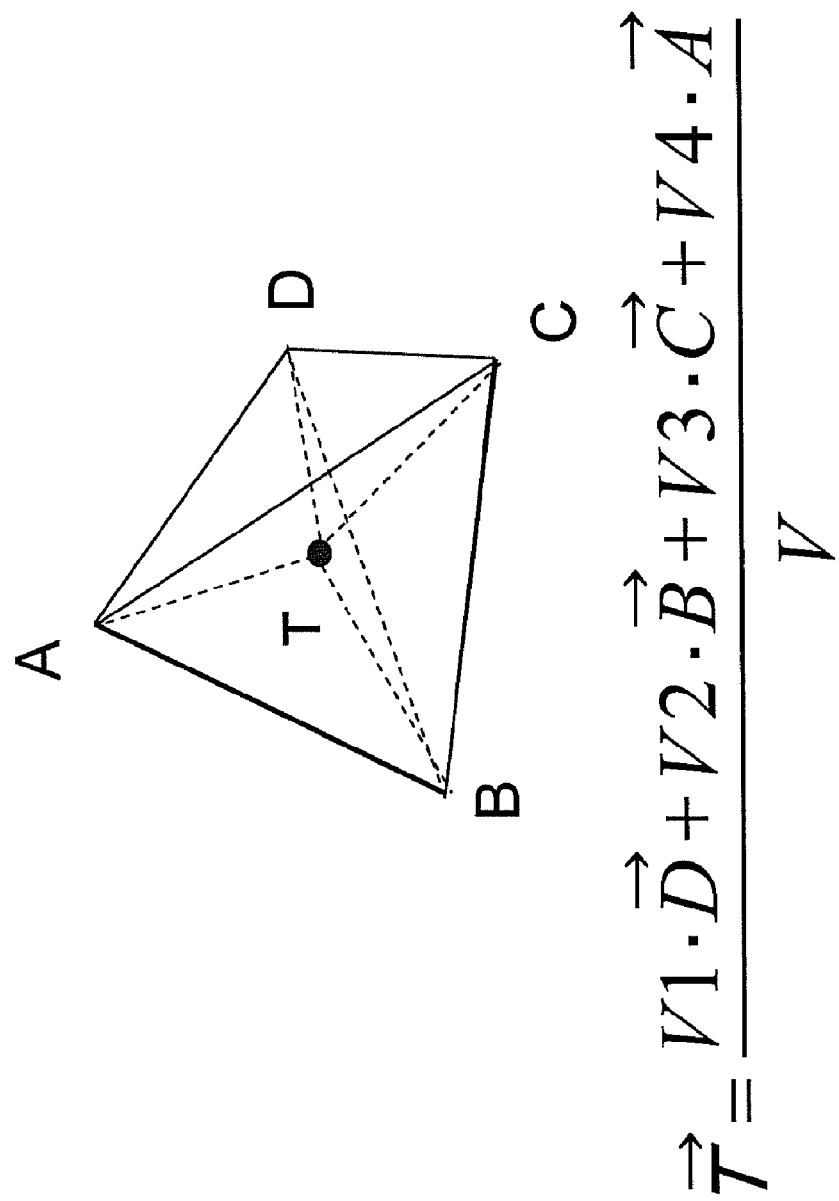
FIG. 8 is an explanatory diagram for illustrating a tetrahedron interpolation process according to the embodiment of the present invention.

As a specific arithmetic operation method, as illustrated in FIG. 8, if the target point T exists inside a tetrahedron ABCD, the values of the target point T (in other words, adjustment point) may be obtained by the following Equation 1 based on a volume ratio.

$$\vec{T} = \frac{V1 \cdot \vec{D} + V2 \cdot \vec{B} + V3 \cdot \vec{C} + V4 \cdot \vec{A}}{V} \qquad \text{Equation 1}$$

In Equation 1, T represents the target point, V represents the volume of the tetrahedron ABCD, V1 represents the volume of a tetrahedron T-ABC, V2 represents the volume of a tetrahedron T-ACD, V3 represents the volume of a tetrahedron T-ABD, and V4 represents the volume of a tetrahedron T-BCD.

Then, the obtained coordinates (X, Y, Z) of the adjustment point are subjected to an inverse conversion into an RGB format to obtain the input color values (R'G'B') to be adjusted.

The subdivision unit 22 includes, as illustrated in FIG. 5, a nearest neighbor point position determination unit 221, an adjacent plane calculation unit 222, an intersection point position determination unit 223, a distance determination unit 224, and a subdivision correction unit 225.

If a given target point T does not exist inside the color gamut of the adjustment subject machine 1, the nearest neighbor point position determination unit 221 obtains the lattice point located in the nearest neighbor (nearest neighbor point C1) of the target point T. Then, it is determined whether or not the nearest neighbor point C1 exists on a boundary plane of the given color gamut or inside the color gamut.

The nearest neighbor point C1 is one of the lattice points that form the color gamut of the adjustment subject machine 1, and hence it is easy to determine whether or not the nearest neighbor point C1 exists on the boundary plane of the color gamut or inside the color gamut.

For example, when the color gamut of the adjustment subject machine 1 is acquired, the coordinates or IDs of the lattice points existing on the boundary plane may be stored and compared with one another during the nearest neighbor point position determination.

If the nearest neighbor point C1 is determined to exist on the boundary plane of the color gamut of the adjustment subject machine 1, the adjacent plane calculation unit 222 identifies a plurality of lattice points on the boundary plane adjacent to the nearest neighbor point C1, and acquires adjacent planes formed by the identified plurality of lattice points and the nearest neighbor point C1.

Figure 9A:
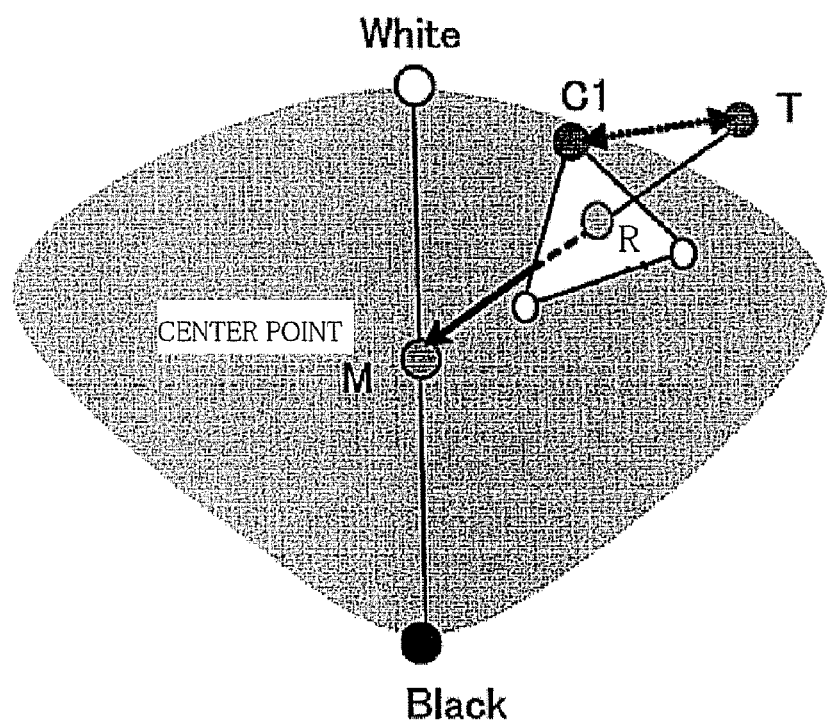
FIGS. 9A and 9B are explanatory diagrams for illustrating a vector operation executed by a subdivision unit according to the embodiment of the present invention.

For example, as illustrated in FIG. 9A, the adjacent plane calculation unit 222 searches for a triangular plane formed by the nearest neighbor point C1 and two lattice points in the color gamut adjacent to the nearest neighbor point C1, and acquires a plurality of triangular planes existing around the nearest neighbor point C1 as the adjacent planes.

The intersection point position determination unit 223 determines whether or not an intersection point R exists on each of the acquired adjacent planes between a line segment TM that connects the target point T and a center point M of the color gamut of the adjustment subject machine 1 and the boundary plane of the color gamut. As illustrated in FIG. 9A, the center point M is set as an intermediate point of a lightness axis including "White" and "Black". Then, the coordinates of the intersection point R between the line segment TM are obtained based on a vector operation.

Described next is the vector operation performed by the intersection point position determination unit 223.

Figure 9B:
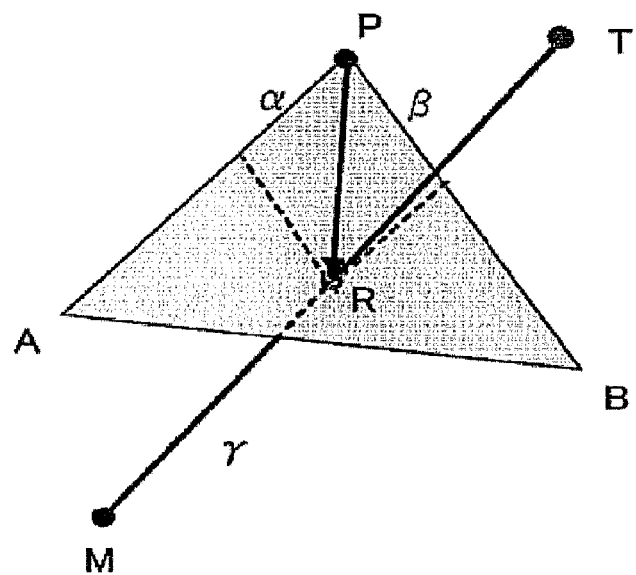

FIG. 9B is a diagram illustrating one adjacent plane and the line segment TM extracted from FIG. 9A. In FIG. 9B, P represents the neighbor point C1, A and B represent the two lattice points on the boundary plane adjacent to the neighbor point C1, and ΔPAB represents the adjacent plane.

First, when a determination is made that the intersection point R between the line segment TM and the boundary plane of the color gamut exists on the plane ΔPAB, the following Equation 2 is established.

$$\vec{PR} = \alpha\vec{PA} + \beta\vec{PB}$$

$$\vec{OR} - \vec{OP} = \alpha(\vec{OA} - \vec{OP}) + \beta(\vec{OB} - \vec{OP})$$

$$\vec{OR} = \alpha(\vec{OA} - \vec{OP}) + \beta(\vec{OB} - \vec{OP}) + \vec{OP} \quad \text{Equation 2}$$

Further, if the intersection point R is a point on the line segment TM, the following Equation 3 is established.

$$\vec{MR} = \gamma\vec{MT}$$

$$\vec{OR} - \vec{OM} = \gamma(\vec{OT} - \vec{OM})$$

$$\vec{OR} = \gamma(\vec{OT} - \vec{OM}) + \vec{OM} \quad \text{Equation 3}$$

Then, based on Equation 2 and Equation 3, a relational expression regarding the intersection point R is represented by the following Equation 4.

$$\vec{OR} = \alpha(\vec{OA} - \vec{OP}) + \beta(\vec{OB} - \vec{OP}) + \vec{OP} = \gamma(\vec{OT} - \vec{OM}) + \vec{OM} \quad \text{Equation 4}$$

$$\alpha(\vec{OA} - \vec{OP}) + \beta(\vec{OB} - \vec{OP}) + \gamma(\vec{OM} - \vec{OT}) = (\vec{OM} - \vec{OP})$$

$$[(\vec{OA} - \vec{OP})(\vec{OB} - \vec{OP})(\vec{OM} - \vec{OT})]\begin{bmatrix}\alpha\\\beta\\\gamma\end{bmatrix} = [(\vec{OM} - \vec{OP})]$$

For brevity, a part of Equation 4 is replaced by the following Equation 5.

$$E = \vec{OA} - \vec{OP}$$

$$F = \vec{OB} - \vec{OP}$$

$$G = \vec{OM} - \vec{OT}$$

$$H = \vec{OM} - \vec{OP} \quad \text{Equation 5}$$

Therefore, the relational expression regarding the intersection point R may be represented by the following Equation 6.

$$\begin{bmatrix}E_x & F_x & G_x\\ E_y & F_y & G_y\\ E_z & F_z & G_z\end{bmatrix}\begin{bmatrix}\alpha\\\beta\\\gamma\end{bmatrix} = \begin{bmatrix}H_x\\H_y\\H_z\end{bmatrix} \quad \text{Equation 6}$$

$$\begin{bmatrix}\alpha\\\beta\\\gamma\end{bmatrix} = \begin{bmatrix}E_x & F_x & G_x\\ E_y & F_y & G_y\\ E_z & F_z & G_z\end{bmatrix}^{-1}\begin{bmatrix}H_x\\H_y\\H_z\end{bmatrix}$$

Then, based on Equation 6, the values α, β, and γ may be calculated.

Note that it is a condition that the target point T exists outside the color gamut of the adjustment subject machine 1, and hence the following Equation 7 needs to be satisfied in order that the intersection point R may exist on the plane ΔPAB.

$$0 \leq \alpha + \beta \leq 1.0$$

$$0 \leq \alpha \leq 1.0$$

$$0 \leq \beta \leq 1.0$$

$$0 \leq \gamma \leq 01.0 \quad \text{Equation 7}$$

Therefore, based on Equation 6, the coordinates of the intersection point R may be obtained by the values α, β, and γ. Then, based on Equation 7, it is possible to determine whether or not the intersection point R exists on the adjacent plane.

If it is determined that the intersection point R between the line segment TM and the color gamut of the adjustment subject machine 1 exists on the adjacent plane of the nearest neighbor point C1, then the distance determination unit 224 determines which distance is shorter: the first distance |TR| between the intersection point R and the target point T, or the second distance |TC1| between the nearest neighbor point C1 and the target point T.

As a result, if it is determined that the distance |TC1| is shorter, a subdivision process is performed to obtain the adjustment point corresponding to the target point T.

If it is determined that the nearest neighbor point C1 does not exist on the boundary plane of the color gamut of the adjustment subject machine 1 (in other words, if it is determined during the inside/outside determination that the target point T does not exist inside the tetrahedron while the nearest neighbor point Cl is the lattice point existing inside the color gamut of the adjustment subject machine 1), then the subdivision correction unit 225 subdivides the lattice points on the XYZ color space surrounding the nearest neighbor point Cl. Then, the subdivided lattice point located closest in proximity to the target point T is obtained, and the coordinates of the point are set as the coordinates of the adjustment point corresponding to the target point T.

Figure 10:
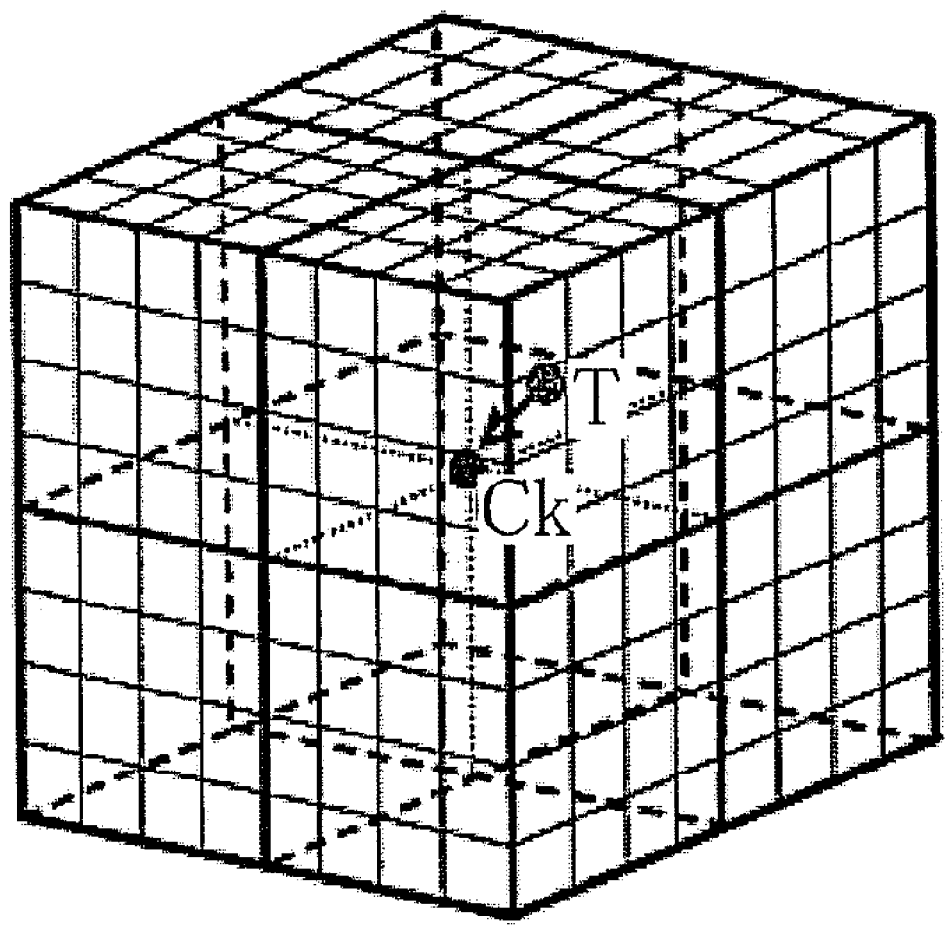
FIG. 10 is an explanatory diagram for illustrating a subdivision process executed by a subdivision correction unit according to the embodiment of the present invention.

Specifically, as illustrated in FIG. 10, the lattice points are increased by dividing the color space into a predetermined number at the nearest neighbor point Cl or between the lattice points adjacent to the nearest neighbor point Cl, and the coordinates of the lattice point in the shortest distance among all the lattice points are obtained.

Further, if the intersection point position determination unit 223 determines that the intersection point R does not exist on the adjacent plane, the subdivision correction unit 225 obtains the adjustment point corresponding to the target point T through the same subdivision process.

If the distance determination unit 224 determines that distance |TC1| is shorter, the subdivision correction unit 225 obtains the adjustment point corresponding to the target point T through the same subdivision process.

Then, the coordinates of the adjustment points (in other words, the XYZ values) are subjected to the inverse conversion into the RGB format to thereby obtain the input color values (R' G'B') to be adjusted.

If the distance determination unit 224 determines that distance |TR| is shorter, the correction process unit 23 sets the coordinates of the intersection point R as the coordinates of the adjustment point corresponding to the target point T.

The color conversion process unit 30 includes, as illustrated in FIG. 2, a color value adjustment table generating unit 31 and a table organization unit 32.

The color value adjustment table generating unit 31 generates a color value adjustment table for converting input color values into the input color values obtained based on the coordinates of the adjustment point calculated by any one of the interpolation process unit 21, the subdivision unit 22, and the correction process unit 23.

Specifically, the color value adjustment table generating unit 31 generates a conversion table (RGB to R' G'B') that associates the input color values (RGB) of the color chart used in the color gamut acquisition with the corresponding input color values (R' G'B').

The table organization unit 32 logically combines the color value adjustment table and a color look up table originally provided to the adjustment subject machine 1 (see FIGS. 1A and 1B). Therefore, the table organization unit 32 converts arbitrary input color values based on the color value adjustment table, and causes the converted input color values to be input as the input color values based on the originally-provided color look up table.

Accordingly, it becomes possible to realize an output according to the characteristics of the target machine 2 with regard to an arbitrary image input to the adjustment subject machine 1, and to reproduce a desired tint.

Described next is a color conversion adjustment procedure of this embodiment having such a configuration with reference to FIGS. 11 and 12.

Figure 11:
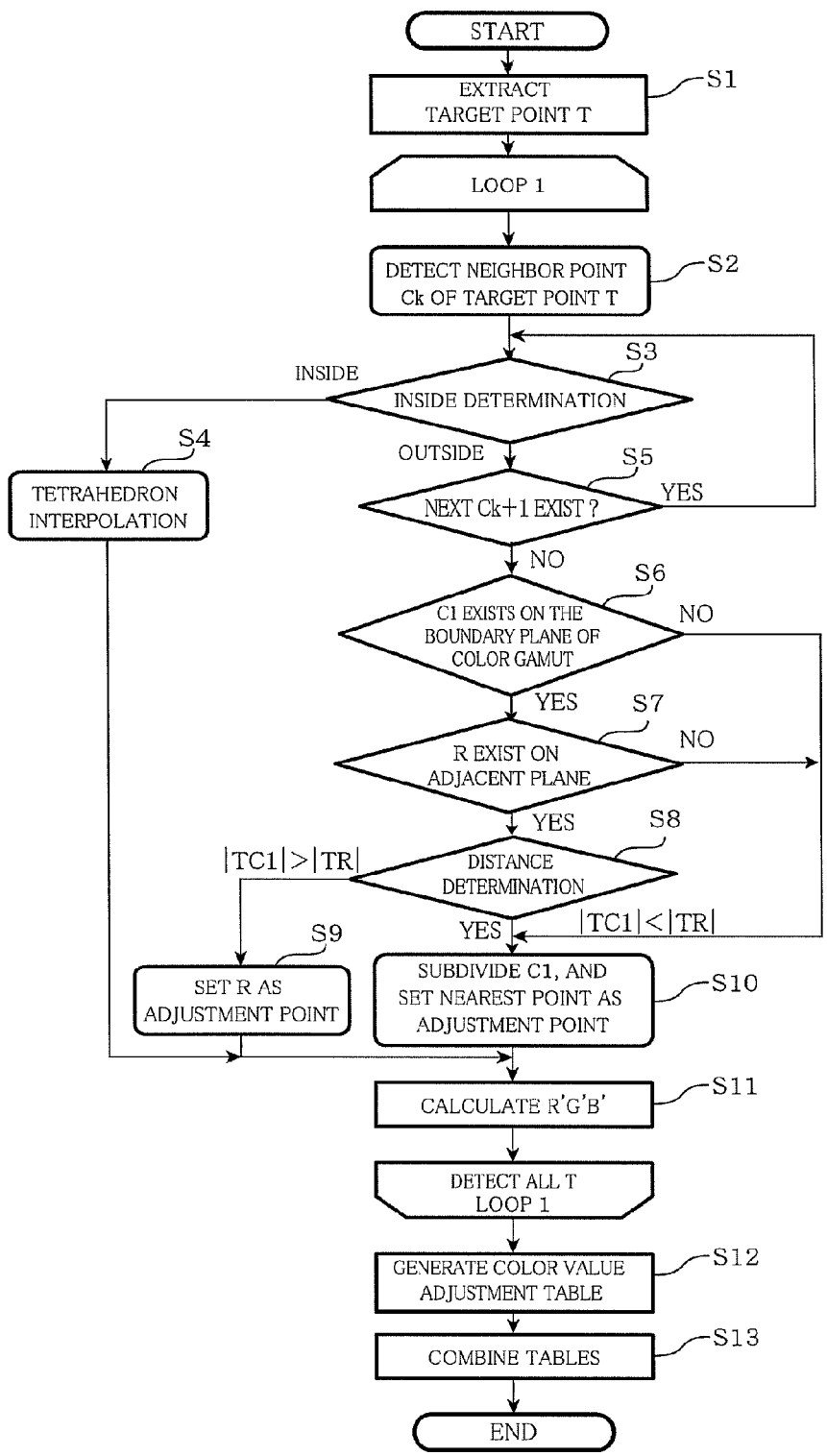
FIG. 11 is a flowchart illustrating a color conversion adjustment procedure executed in the embodiment of the present invention.
Figure 12:
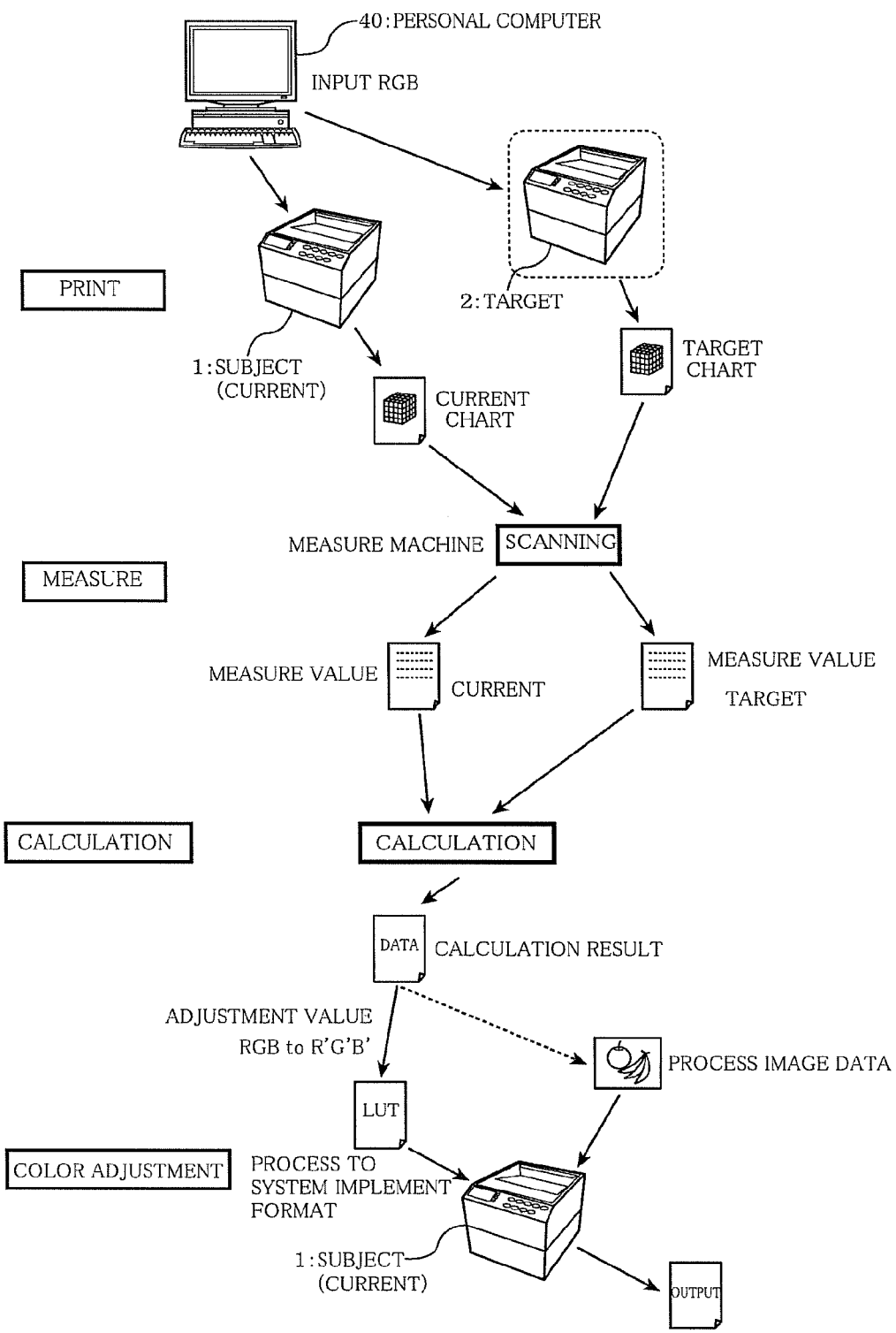
FIG. 12 is a diagram illustrating an outline of the color conversion adjustment procedure executed in the embodiment of the present invention.

FIG. 11 is a flowchart illustrating a procedure for a color conversion adjustment performed by the color look up table adjusting apparatus according to this embodiment. FIG. 12 is a schematic diagram illustrating an outline thereof.

As illustrated in FIG. 11, first, the color look up table adjusting apparatus of this embodiment (in other words, the color gamut acquisition unit 11 of the adjustment subject machine 1) extracts an arbitrary target point T corresponding to the lattice point of the adjustment subject machine 1 (S1). For example, as illustrated in FIG. 12, the color chart (input RGB) generated by a personal computer 40 is printed from each of the adjustment subject machine 1 and the target machine 2. Then, each of the printed color charts is scanned to thereby measure the current color gamuts of the adjustment subject machine 1 and the target machine 2.

Subsequently, the procedure shifts to an arithmetic operation process using the acquired measured values.

First, in the interpolation process unit 21 of the mapping process unit 20, the neighbor point detection unit 211 detects the neighbor point Ck of the target point T (S2).

Here, the inside/outside determination unit 212 performs the inside/outside determination for the target point T based on the neighbor point Ck (S3). Specifically, it is determined whether or not the target point T exists inside the tetrahedron using the tetrahedron including the neighbor point Ck.

As a result of the inside/outside determination, if it is determined that the target point T exists inside any one of the tetrahedrons including the neighbor point Ck (S3: inside), it is determined that the target point T exists inside the color gamut of the adjustment subject machine 1. In this case, the interpolation operation unit 213 obtains the adjustment point corresponding to the tetrahedron interpolation process using the tetrahedron that includes the neighbor point Ck (S4), and calculates the input color values (R'G'B') from the coordinates (XYZ) of the adjustment point (S11).

As a result of the inside/outside determination, if it is determined that the target point T does not exist inside any one of the tetrahedrons including the neighbor point Ck (S3: outside), the detection of the next neighbor point Ck+1 is attempted (S5).

If the next neighbor point Ck+1 exists (S5: YES), the procedure returns to Step S3, and the inside/outside determination is performed again for the same target point T.

On the other hand, if the next neighbor point Ck+1 does not exist (S5: NO), it is determined that the target point T does not exist inside the color gamut of the adjustment subject machine 1, and the procedure advances to the next Step S6.

Subsequently, the nearest neighbor point position determination unit 221 determines whether or not the nearest neighbor point Cl exists on the boundary plane of the color gamut of the adjustment subject machine 1 (S6). If it is determined that the nearest neighbor point Cl exists on the boundary plane (S6: YES), the procedure advances to Step S7.

In Step S7, the adjacent plane calculation unit 222 of the subdivision unit 22 obtains the adjacent plane of the nearest neighbor point Cl on the boundary plane of the color gamut of the adjustment subject machine 1. Further, the intersection point position determination unit 223 obtains the intersection point R between the line segment TM that connects the target point T and the center point M of the color gamut and the boundary plane, and determines whether or not the intersection point R exists on the adjacent plane (S7).

As a result, if it is determined that the intersection point R exists on the adjacent plane (S7: YES), the distance determination unit 224 then performs a distance determination (S8).

Specifically, the distance determination unit 224 performs a comparison between the distance |TR| from the target point T to the intersection point R and the distance |TC1| from the target point T to the nearest neighbor point C1. If it is determined that the distance |TR| is shorter than the distance |TC1| (S8: |TC1|>|TR|), the correction process unit 23 sets the intersection point R as the adjustment point, and calculates the input color values (R'G'B') from the coordinates (XYZ) of the adjustment point (S9). On the other hand, if it is determined that the distance |TC1| is shorter than the distance |TR| (S8: |TC1|<|TR|), the subdivision correction unit 225 obtains new lattice points by subdividing the nearest neighbor point C1 and its surroundings, and obtains the lattice point nearer to the target point T among those lattice points as the adjustment point (S10). Then, the subdivision correction unit 225 calculates the input color values (R'G'B') from the coordinates (XYZ) of the obtained adjustment point (S11).

If it is determined in Step S6 that the nearest neighbor point C1 does not exist on the boundary plane (S6: NO), or if it is determined in Step S7 that the intersection point R does not exist on the adjacent plane (S7: NO), the same subdivision correction process (S10 and S11) is performed.

Further, the process of Steps S2 to S11 is performed for all of the target points T set in advance (Loop 1).

Subsequently, based on a result of the arithmetic operation, "adaptation of colors", in other words, a process for a system implementation, is performed.

The color value adjustment table generating unit 31 of the color conversion process unit 30 generates the color value adjustment table (RGB to R'G'B') based on the input color values (R'G'B') of the adjustment point acquired in Step S11 and the corresponding input color values (RGB) (S12). Then, the table organization unit 32 combines the generated color value adjustment table and the existing color look up table (S13). Accordingly, arbitrary input RGB data is temporarily converted (adjusted) into the input color values (R'G'B') based on the color value adjustment table, and the input color values (R'G'B') are subsequently output after being converted into CMYK based on the existing color look up table. The output values are adjusted according to the color conversion characteristic exhibited by the target machine 2. Therefore, for example, the tint of the subject image data such as a picture of an apple illustrated in FIG. 12 is adjusted into a desired tint.

The above-mentioned color look up table adjusting apparatus of this embodiment is implemented by processes, means, and functions executed by a computer according to instructions from a color conversion table adjusting program (software). The color look up table adjusting program sends a command to each component of the computer to cause the component to perform a process/function. In other words, on the color look up table adjusting apparatus (adjustment subject machine 1) of this embodiment, each of the processes, such as color gamut acquisition (including variance calculation and representative value selection), interpolation process (neighbor point detection, inside/outside determination, and interpolation operation), subdivision process (nearest neighbor point position determination, adjacent plane calculation, intersection point position determination, distance determination, and subdivision correction), correction process, color value adjustment table generation, and table combination, is realized by specific means based on cooperation between the color look up table adjusting program and the computer.

Note that an entirety or a part of the program is provided by, for example, a magnetic disk, an optical disk, a semiconductor memory, or other such arbitrary computer-readable recording medium, and is executed after the program read from the recording medium is installed onto the computer. Further, the program may be executed by being loaded directly onto the computer through a communication line without the intermediation of the recording medium.

As described above, according to the color look up table adjusting apparatus (adjustment subject machine 1) of this embodiment, it is possible to effectively reproduce the tint to be exhibited by the target machine 2.

The color gamut of the adjustment subject machine 1 and the color gamut of the target machine 2 are expressed on the device-independent XYZ space, and a color adjustment process is collectively performed based on a positional relationship between the target color values (target point) and the color gamut of the adjustment subject machine 1. Accordingly, it is possible to eliminate time and labor to individually adjust color values.

As a specific color adjustment process, first, if the position of the target point T exists inside the color gamut of the adjustment subject machine 1, the color is matched with that of the target machine 2 by the tetrahedron interpolation process.

Further, if the position of the target point T exists outside the color gamut of the adjustment subject machine 1, the subdivision process and the distance determination are performed to obtain the coordinates located nearest to the target point T and adjust the color values into those of the coordinates.

In order to realize such a color adjustment process, the existing color look up table is used instead of restructuring the existing color look up table or generating a new color look up table. Specifically, the color value adjustment table for converting input color values into other input color values is incorporated, and the input color values obtained by being subjected to the conversion process are output through the existing color look up table.

The color value adjustment table is generated by, for example, obtaining the color values (R'G'B') that may express the target color or the color closest thereto based on the color values (RGB) of the input image data and associating the color values (RGB) of the input image data with the other color values (R'G'B'). Accordingly, unlike a conventional case, a simple arithmetic operation based on the conversion between the same dimensions is made possible without the need for the color conversion between different dimensions (for example, RGB→CMYK: three dimensions→four dimensions).

As described above, according to the color look up table adjusting apparatus (adjustment subject machine 1) of this embodiment, it becomes possible to reproduce the color realized by another image forming apparatus with efficiency and precision.

Further, without making a modification to an image forming function, all the processes may be executed only by the arithmetic operation process.

This allows a technician without superior knowledge, a general user without knowledge on chromatology, and the like to perform an optimal color adjustment for the image forming apparatus.

The color look up table adjusting apparatus according to the present invention has been described above by referring to the preferable embodiment, but the color look up table adjusting apparatus according to the present invention is not limited only to the above-mentioned embodiment, and various changes may be made within the scope of the present invention.

For example, the color look up table adjusting apparatus according to the present invention may be used not only for a printing apparatus such as a color printer but also for various image process apparatuses that perform a color image process, such as a color display and a facsimile apparatus.

What is claimed is:

1. A color look up table adjusting apparatus, comprising:
a color gamut acquisition unit configured to determine, from an image output by an image forming apparatus based on input color values, a lattice point indicating a position of the input color values in a color space and an area including the lattice point as a color gamut of the image forming apparatus, and further configured to determine, from an image output by another image forming apparatus based on the input color values, a position of the input color values in the color space as a target point;
an interpolation process unit configured to calculate a point corresponding to the target point within the color gamut of the image forming apparatus as an adjustment point;
a color value adjustment table generating unit configured to generate a color value adjustment table for converting the input Color values into converted input color values corresponding to a position of the adjustment point; and
a table organization unit configured to convert arbitrary input color values based on the color value adjustment table, and inputs converted input color values as input color values based on a color look up table.

2. The color look up table adjusting apparatus according to claim 1, wherein the color space comprises one of an XYZ space and an L*a*b* space.

3. The color look up table adjusting apparatus according to claim 1, further comprising:
a neighbor point detection unit configured to detect a predetermined number of lattice points, which are located in proximity to the target point based on a distance between the target point and the lattice point in the color space, as neighbor points;
an inside/outside determination unit configured to determine whether or not the target point exists inside the color gamut based on at least one of the neighbor points and lattice points adjacent to the neighbor points; and
an interpolation operation unit configured to calculate coordinates of the adjustment point by an interpolation process based on lattice points adjacent to the target point if it is determined that the target point exists inside the color gamut.

4. The color look up table adjusting apparatus according to claim 3, further comprising:
a neighbor point detection unit configured to detect a neighbor point located nearest to the target point from among the neighbor points as a nearest neighbor point;
a nearest neighbor point position determination unit configured to determine whether or not the nearest neighbor point exists on a boundary plane of the color gamut if it is determined that the target point does not exist inside the color gamut;
an adjacent plane calculation unit configured to identify a plurality of lattice points on the boundary plane of the color gamut adjacent to the nearest neighbor point if it is determined that the nearest neighbor point exists on the boundary plane of the color gamut, and determines an adjacent plane formed by the identified plurality of lattice points and the nearest neighbor point;
an intersection point position determination unit configured to determine whether or not an intersection point between a line segment that connects the target point and a center of the color gamut and the boundary plane exists on the adjacent plane;
a distance determination unit configured to measure a first distance from the intersection point to the target point and a second distance from the nearest neighbor point to the target point if it is determined that the intersection point exists on the adjacent plane, and configured to determine which of the first distance and the second distance is shorter than the other; and
a subdivision correction unit configured to calculate, as the coordinates of the adjustment point, coordinates of a lattice point having a shortest distance from the target point among all the lattice points including lattice points obtained by dividing a coordinate space surrounded by the plurality of lattice points adjacent to the nearest neighbor point in one of a case where it is determined by the nearest neighbor point position determination unit that the nearest neighbor point does not exist on the boundary plane of the color gamut, a case where it is determined by the intersection point position determination unit that the intersection point does not exist inside the adjacent plane, and a case where it is determined by the distance determination unit that the second distance is shorter.

5. The color look up table adjusting apparatus according to claim 4, further comprising a correction process unit configured to calculate coordinates of the intersection point as the coordinates of the adjustment point based on a vector operation if it is determined by the distance determination unit that the first distance is shorter.

6. The color look up table adjusting apparatus according to claim 3, wherein, in the interpolation process, the interpolation operation unit calculates coordinates of the target point as the coordinates of the adjustment point by determining the coordinates of the target point determined to exist inside the color gamut by the following equation based on a volume ratio between one tetrahedron including the target point and four tetrahedrons that form the one tetrahedron:

$$\vec{T} = \frac{V1 \cdot \vec{D} + V2 \cdot \vec{B} + V3 \cdot \vec{C} + V4 \cdot \vec{A}}{V}$$

where T represents the target point, V represents a volume of the one tetrahedron (ABCD), V1 represents a volume of a first of the four tetrahedrons (T-ABC), V2 represents a volume of a second of the four tetrahedrons (T-ACD), V3 represents a volume of a third of the four tetrahedrons (T-ABD), and V4 represents a volume of a fourth of the four tetrahedrons (T-BCD).

7. The color look up table adjusting apparatus according to claim 3, wherein the inside/outside determination unit is configured to determine whether or not the target point exists inside the color gamut based on whether or not the target point exists inside a hexahedron formed of six quadrangles, each of which is formed of one of the neighbor points and lattice points adjacent to the one of the neighbor points.

8. The color look up table adjusting apparatus according to claim 7, wherein the inside/outside determination unit is configured to determine whether or not the target point exists inside the hexahedron based on whether or not the target point exists inside a tetrahedron obtained by dividing the hexahedron.

9. The color look up table adjusting apparatus according to claim 8, wherein the inside/outside determination unit is configured to determine whether or not the target point exists inside the tetrahedron by a tetrahedron determination process using four triangular planes that form the tetrahedron for each of the tetrahedrons, and is configured to determine that the target point exists inside one of the hexahedron and the color gamut if it is determined that the target point exists inside at least one of the tetrahedrons and to determine that the target point exists inside none of the hexahedron and the color gamut if it is determined that the target point exists inside none of the tetrahedrons.

10. The color look up table adjusting apparatus according to claim 9, wherein, in the tetrahedron determination process, the inside/outside determination unit obtains the following equation F(t) (where t=1 to 4) indicating each of the four triangular planes that form the tetrahedron, and as a result of substituting coordinates $(n_z, n_y, n_z)$ of the target point into the equation, the inside/outside determination unit determines that the target point exists inside the tetrahedron if F(t)<0 for all the four triangular planes, determines that the target point exists on at least one of the four triangular planes if F(t)=0 for the at least one of the four triangular planes, and determines that the target point exists outside the tetrahedron if F(t)>0 for the at least one of the four triangular planes:

$$F(t)=n_x(x-a_x)+n_y(y-a_y)+n_z(z-a_x)$$

where a first vector (a) is set as $(a_x, a_y, a_z)$ assuming that a, b, and c represent vertices of one of the four triangular planes, respectively, and a normal vector (n) to the one of the four triangular planes formed by a second vector (b) and a third vector (c) is set as $n=b \times c=(n_x, n_y, n_z)$.

11. A non-transitory computer readable recording medium having a color look up table adjusting program recorded thereon, the color look up table adjusting program causing a computer to execute:
a color gamut acquisition step of determining, from a first image output by an image forming apparatus based on input color values, a lattice point indicating a position of the input color values in a color space and an area including the lattice point as a color gamut of the image forming apparatus, and determining, from an image output by another image forming apparatus based on the input color values, a position of the input color values in the color space as a target point;
an interpolation process step of calculating a point corresponding to the target point within the color gamut of the first image forming apparatus as an adjustment point;
a color value adjustment table generating step of generating a color value adjustment table for converting the input color values into converted input color values corresponding to a position of the adjustment point; and
a table organization step of converting arbitrary input color values based on the color value adjustment table, and inputting converted input color values as input color values based on a color look up table.

12. The non-transitory computer readable recording medium according to claim 11, wherein in the color look up table adjusting program, the color space comprises one of an XYZ space and an L*a*b* space.

13. The non-transitory computer readable recording medium according to claim 11, wherein the color look up table adjusting program further causes the computer to execute:

a neighbor point detection step of detecting a predetermined number of lattice points, which are located in proximity to the target point based on a distance between the target point and the lattice point in the color space, as neighbor points;
an inside/outside determination step of determining whether or not the target point exists inside the color gamut based on at least one of the neighbor points and lattice points adjacent to the neighbor points; and
an interpolation operation step of calculating coordinates of the adjustment point by an interpolation process based on lattice points adjacent to the target point if it is determined that the target point exists inside the color gamut.

14. The non-transitory computer readable recording medium according to claim 13, wherein the color look up table adjusting program further causes a computer to execute:
a neighbor point detection step of detecting a neighbor point located nearest to the target point from among the neighbor points as a nearest neighbor point;
a nearest neighbor point position determination step of determining whether or not the nearest neighbor point exists on a boundary plane of the color gamut if it is determined that the target point does not exist inside the color gamut;
an adjacent plane calculation step of identifying a plurality of lattice points on the boundary plane of the color gamut adjacent to the nearest neighbor point if it is determined that the nearest neighbor point exists on the boundary plane of the color gamut, and determining an adjacent plane formed by the identified plurality of lattice points and the nearest neighbor point;
an intersection point position determination step of determining whether or not an intersection point between a line segment that connects the target point and a center of the color gamut and the boundary plane exists on the adjacent plane;
a distance determination step of measuring a first distance from the intersection point to the target point and a second distance from the nearest neighbor point to the target point if it is determined that the intersection point exists on the adjacent plane, and determining which of the first distance and the second distance is shorter than the other; and
a subdivision correction step of calculating, as the coordinates of the adjustment point, coordinates of a lattice point having a shortest distance from the target point among all the lattice points including lattice points obtained by dividing a coordinate space surrounded by the plurality of lattice points adjacent to the nearest neighbor point in one of a case where it is determined in the nearest neighbor point position determination step that the nearest neighbor point does not exist on the boundary plane of the color gamut, a case where it is determined in the intersection point position determination step that the intersection point does not exist inside the adjacent plane, and a case where it is determined in the distance determination step that the second distance is shorter.

15. The non-transitory computer readable recording medium according to claim 14, wherein the color look up table adjusting program further causes a computer to execute a correction process step of calculating coordinates of the intersection point as the coordinates of the adjustment point based on a vector operation if it is determined in the distance determination step that the first distance is shorter.

16. The non-transitory computer readable recording medium according to claim 13, wherein, in the color look up table adjusting program, the inside/outside determination step comprises determining whether or not the target point exists inside the color gamut based on whether or not the target point exists inside a hexahedron formed of six quadrangles each of which is formed of one of the neighbor points and lattice points adjacent to the one of the neighbor points.

17. The computer-readable recording medium according to claim 16, wherein, in the color look up table adjusting program, the inside/outside determination step further comprises determining whether or not the target point exists inside the hexahedron based on whether or not the target point exists inside a tetrahedron obtained by dividing the hexahedron.

18. The non-transitory computer readable recording medium according to claim 17, wherein, in the color look up table adjusting program, the inside/outside determination step further comprises determining whether or not the target point exists inside the tetrahedron by a tetrahedron determination process using four triangular planes that form the tetrahedron for each of the tetrahedrons, and determines that the target point exists inside one of the hexahedron and the color gamut if it is determined that the target point exists inside at least one of the tetrahedrons while determining that the target point exists inside none of the hexahedron and the color gamut if it is determined that the target point exists inside none of the tetrahedrons.

19. A color look up table adjusting system, comprising:
a color gamut acquisition unit configured to determine, from an image output by a first image forming apparatus based on input color values, a lattice point indicating a position of the input color values in a color space and an area including the lattice point as a color gamut of the image forming apparatus, and further configured to determine, from an image output by another image forming apparatus based on the input color values, a position of the input color values in the color space as a target point;
an interpolation process unit configured to calculate a point corresponding to the target point within the color gamut of the first image forming apparatus as an adjustment point;
a color value adjustment table generating unit configured to generate a color value adjustment table for converting the input color values into converted input color values corresponding to a position of the adjustment point; and
a table organization unit configured to convert arbitrary input color values based on the color value adjustment table, and inputs converted input color values as input color values based on a color look up table.

20. The color look up table adjusting system according to claim 19, further comprising:
a neighbor point detection unit configured to detect a predetermined number of lattice points, which are located in proximity to the target point based on a distance between the target point and the lattice point in the color space, as neighbor points;
an inside/outside determination unit configured to determine whether or not the target point exists inside the color gamut based on at least one of the neighbor points and lattice points adjacent to the neighbor points; and
an interpolation operation unit configured to calculate coordinates of the adjustment point by an interpolation process based on lattice points adjacent to the target point if it is determined that the target point exists inside the color gamut.

* * * * *